United States Patent
Williams

(10) Patent No.: US 7,091,739 B2
(45) Date of Patent: Aug. 15, 2006

(54) SYSTEM AND METHOD FOR DETECTING AN OPERATIONAL FAULT CONDITION IN A POWER SUPPLY

(75) Inventor: Timothy James Williams, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 10/710,204

(22) Filed: Jun. 25, 2004

(65) Prior Publication Data

US 2005/0285619 A1 Dec. 29, 2005

(51) Int. Cl.
*G01R 31/36* (2006.01)

(52) U.S. Cl. ...................... 324/771; 323/285

(58) Field of Classification Search .................. None
See application file for complete search history.

(56) References Cited

U.S. PATENT DOCUMENTS

| | | | | |
|---|---|---|---|---|
| 4,428,016 A | * | 1/1984 | Brasfield | 361/18 |
| 6,031,743 A | | 2/2000 | Carpenter | 363/65 |
| 6,407,899 B1 | | 6/2002 | Carpenter | 361/86 |
| 6,465,909 B1 | | 10/2002 | Soo et al. | 307/52 |
| 6,473,280 B1 | | 10/2002 | Buxton | 361/18 |
| 6,628,089 B1 | * | 9/2003 | Suomi | 315/194 |
| 6,819,091 B1 | * | 11/2004 | Ishihara et al. | 323/285 |

FOREIGN PATENT DOCUMENTS

FR 2 835 116 7/2003 ................ 3/156

OTHER PUBLICATIONS

PCT Search Report, PCT/US2005/017897, mailing date Nov. 23, 2005.

* cited by examiner

*Primary Examiner*—Minh N. Tang
(74) *Attorney, Agent, or Firm*—Cantor Colburn LLP

(57) ABSTRACT

A system and a method for detecting an operational fault condition in a power supply are provided. The power supply has a controller operably coupled to first and second switches. The first and second switches are connected in series between a voltage source and a ground node, wherein a first electrical node is electrically coupled between the first and second switches. The first electrical node is further coupled to a first end of an inductor. The controller is configured to induce the first and second switches to apply voltage pulses to the first electrical node. The method includes monitoring a voltage at the first electrical node to determine a number of voltage pulses being applied to the first electrical node over a predetermined time interval. The method further includes determining when a first operational fault condition has occurred when the number of voltage pulses being applied to the first electrical node over the predetermined time interval is less than or equal to a predetermined number of voltage pulses.

11 Claims, 4 Drawing Sheets

SYSTEM AND METHOD FOR DETECTING AN OPERATIONAL FAULT CONDITION IN A POWER SUPPLY

BACKGROUND OF INVENTION

In a redundant power supply system, electrical power is supplied by a plurality of power supplies electrically connected in parallel to one another. Generally, a desired system power requirement can be obtained by utilizing the combined output of N power supplies. By adding one additional backup power supply, resulting in N+1 power supplies in the power supply system, the system can electrically remove a failed power supply to avoid a power disruption and still meet the desired system power requirement of N power supplies.

Monitoring circuits have been developed that monitor the operation of a power supply by measuring a DC voltage at an output terminal on the power supply. However, a drawback with the other monitoring circuits is that the power supply may be malfunctioning for a relatively large amount of time before the fault condition causes a voltage or current variance at a power supply output terminal that is detected by the monitoring circuit.

Thus, there is a need for a monitoring system that can detect operational fault conditions in a power supply utilizing internal signals generated by the power supply, instead of merely monitoring a voltage at a power supply output terminal. Internal signals of a power supply are defined as any signal, such as a pulse width modulation signal for example, generated within a power supply to subsequently generate an output voltage at an output terminal of the power supply.

SUMMARY OF INVENTION

A method for detecting an operational fault condition in a power supply in accordance with an exemplary embodiment. The power supply has a controller operably coupled to first and second switches. The first and second switches are connected in series between a voltage source and a ground node, wherein a first electrical node is electrically coupled between the first and second switches. The first electrical node is further electrically coupled to a first end of an inductor. The controller is configured to induce the first and second switches to apply voltage pulses to the first electrical node. The method includes monitoring a voltage at the first electrical node to determine a number of voltage pulses being applied to the first electrical node over a predetermined time interval. The method further includes determining when a first operational fault condition has occurred when the number of voltage pulses being applied to the first electrical node over the predetermined time interval is less than or equal to a predetermined number of voltage pulses.

A system for detecting an operational fault condition in a power supply in accordance with another exemplary embodiment is provided. The power supply has a controller operably coupled to first and second switches. The first and second switches are connected in series between a voltage source and a ground node, wherein a first electrical node is electrically coupled between the first and second switches. The first electrical node is further electrically coupled to a first end of an inductor. The controller is configured to induce the first and second switches to apply voltage pulses to the first electrical node. The system includes a voltage pulse detection circuit operably coupled to the first electrical node that determines the number of voltage pulses being applied to the first electrical node over a predetermined time interval, the voltage pulse detection circuit generating a first signal indicating that a first operational fault condition has occurred when the number of voltage pulses being applied to the first electrical node over the predetermined time interval is less than or equal to a predetermined number of voltage pulses.

A system for detecting an operational fault condition in a power supply in accordance with another exemplary embodiment is provided. The power supply has a controller operably coupled to first and second switches. The first and second switches are connected in series between a voltage source and a ground node, wherein a first electrical node is electrically coupled between the first and second switches. The first electrical node is further electrically coupled to a first end of an inductor. The controller is configured to induce the first and second switches to apply voltage pulses to the first electrical node. The method includes a means for monitoring a voltage at the first electrical node to determine a number of voltage pulses being applied to the first electrical node over a predetermined time interval. The method further includes a means for determining when a first operational fault condition has occurred when the number of voltage pulses being applied to the first electrical node over the predetermined time interval is less than or equal to a predetermined number of voltage pulses.

DETAILED DESCRIPTION

Figure 1:
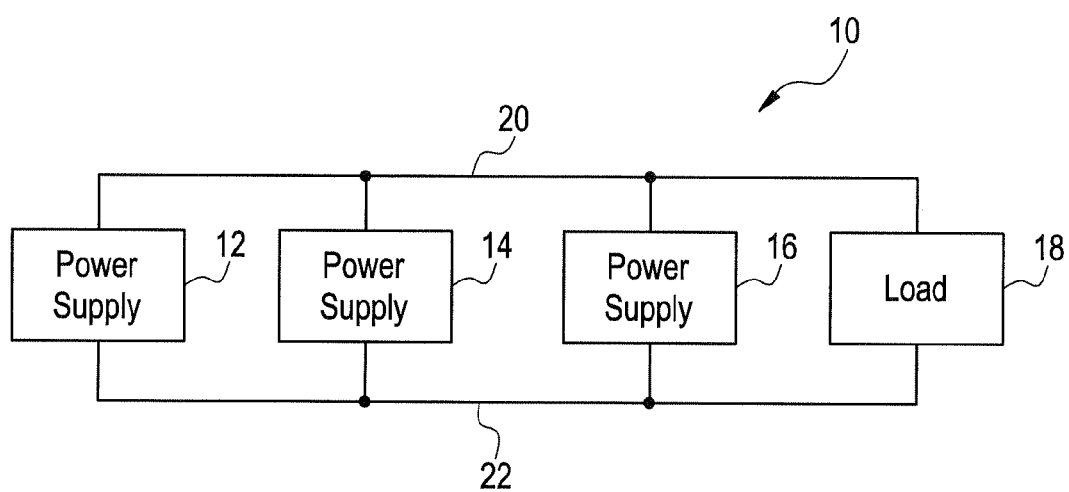
FIG. 1 is a schematic of a power supply system.

Referring to FIG. 1, a power supply system 10 for generating electrical power is illustrated. The power supply system 10 includes power supplies 12, 14, 16, a load 18, electrical lines 20, 22. As shown, each of the power supplies 12, 14, 16 and the load 18 are electrically coupled in parallel via electrical lines 20, 22. Because power supplies 12, 14, 16 have substantially similar circuitry, only power supply 12 will be explained in greater detail below. It should be noted, that the system for detecting fault conditions in the power supply system 10, which will be explained below, can be utilized with circuitry used in any switch mode power supplies.

Figure 2:
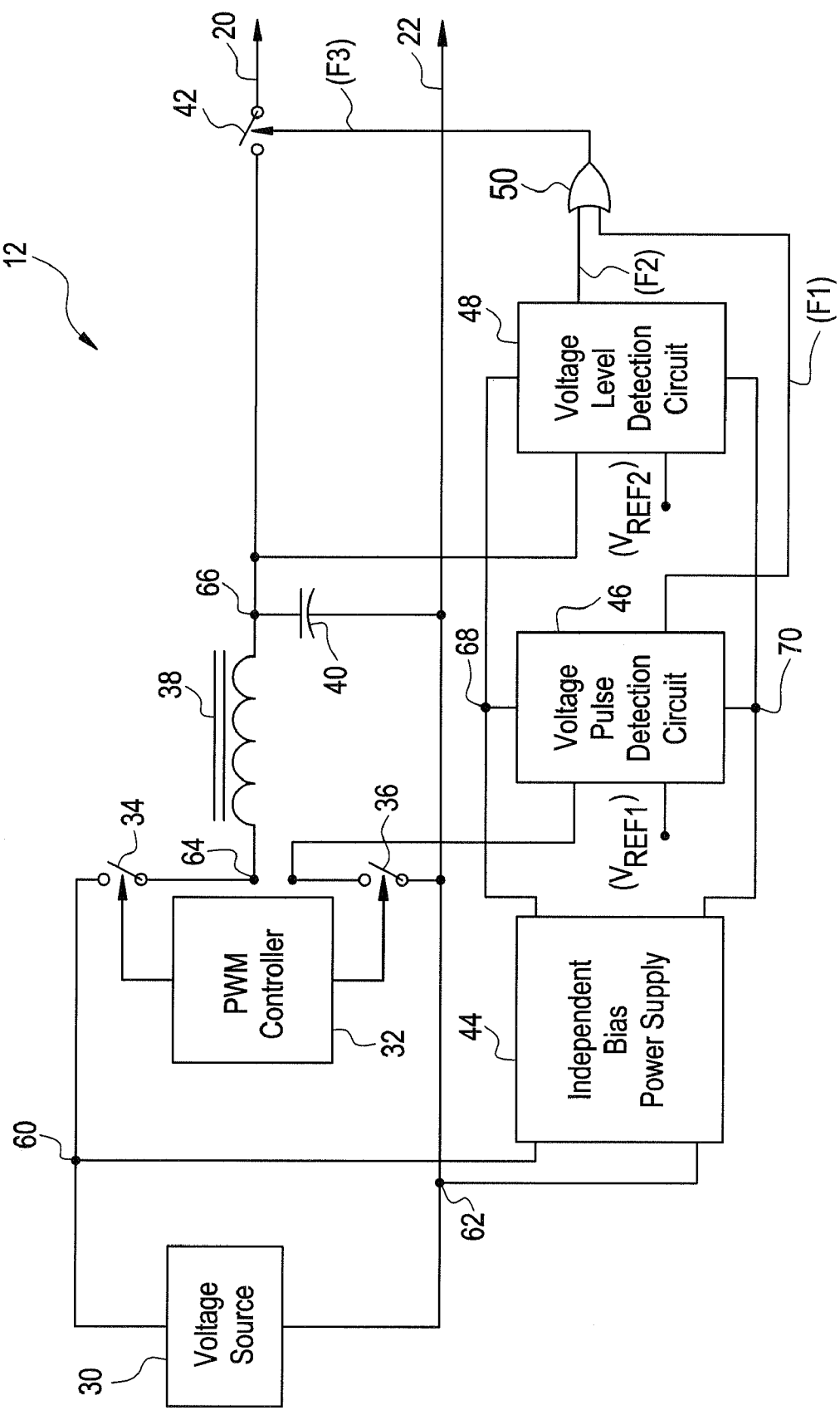
FIG. 2 is a more detailed schematic of a power supply in the power supply system of FIG. 1 having a diagnostic system in accordance with an exemplary embodiment.

Referring to FIG. 2, a detailed schematic of the power supply 12 is illustrated. The power supply system 12 comprises a buck topology switching power supply system. The power supply 12 includes a voltage source 30, a pulse-width modulation (PWM) controller 32, switches 34, 36, an inductor 38, a capacitor 40, a switch 42, a bias power supply 44, a voltage pulse detection circuit 46, a voltage level detection circuit 48, and a logic gate 50. The voltage source 30 supplies a DC voltage between nodes 60, 62.

The switches 34, 36 provide voltage pulses using a voltage from the voltage source 30 that are applied to the inductor 38. The switch 34 is electrically coupled between a node 60 and a node 64. The switch 36 is electrically coupled between the node 62 and the node 64. The switches 34, 36 are also operably coupled to the PWM controller 32. The PWM controller 32 generates control signals that induce the switches 34, 36 to open and close to generate voltage pulses for the inductor 38. Further, the plurality of voltage pulses are applied at a predetermined frequency at the node 64. The PWM controller 32 can vary the duty cycle of the voltage pulses to adjust a DC output voltage at the node 66 to a predetermined level.

The inductor 38 is operably coupled between a node 64 and the node 66 coupled to the capacitor 40. The capacitor 40 is electrically coupled between the node 66 and the node 62. The combination of the inductor 38 and the capacitor 40 converts the voltage pulses applied to the node 64 to a DC voltage at a predetermined voltage level at the node 66.

The switch 42 is operably coupled between the node 66 and the electrical line 20. The switch 42 further is operably coupled to the logic gate 50. When either the voltage pulse detection circuit 46 or a voltage level detection circuit 48 detects an operational fault condition, the logic gate 50 transmits a signal (F3) to the switch 42 having a high logic level. In response, the switch 42 moves to an open operational position to prevent current from flowing from the inductor 38 and/or capacitor 40 to the load 18. Alternately, when neither the voltage pulse detection circuit 46 nor the low-voltage detection circuit 48 detects an operational fault condition, the logic gate 50 transmits a signal (F3) to the switch 42 having a low logic level. In response, the switch 42 moves to a closed operational position to supply current from the inductor 38 and/or capacitor 40 to the load 18.

The bias power supply 44 is operably coupled between the node 60 and the node 62 to supply a voltage to the voltage pulse detection circuit 46 and the voltage level detection circuit 48. The bias power supply 44 is electrically coupled to both the circuit 46 and the circuit 48 at a node 68. The bias power supply 44 is further electrically coupled to the circuit 46 and the circuit 48 at a node 70.

Figure 3:
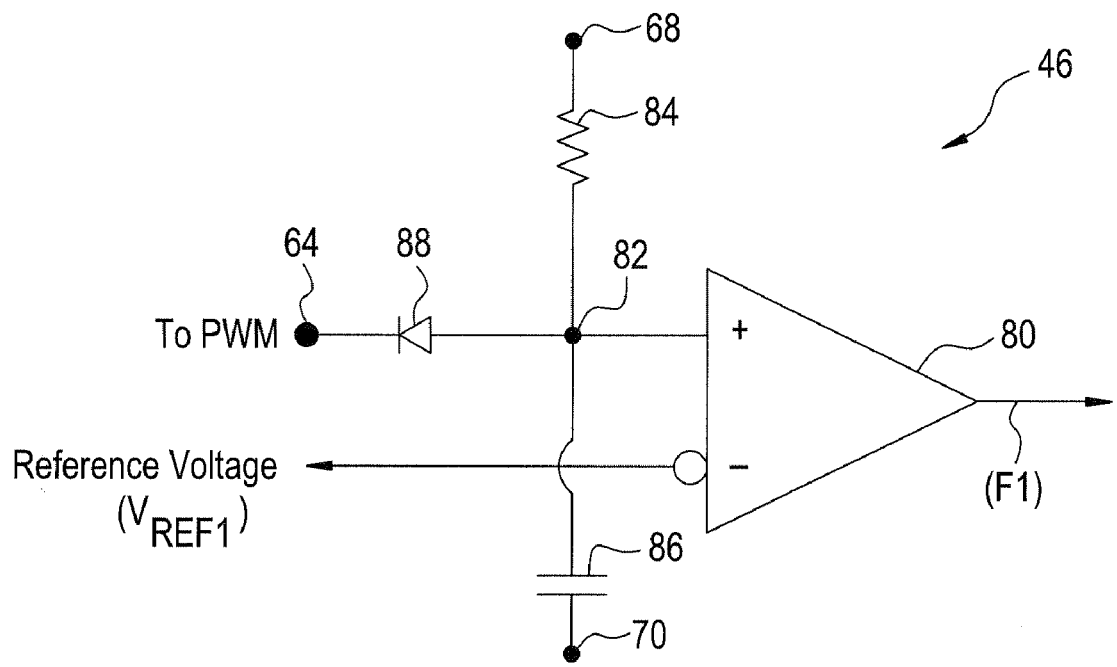
FIG. 3 is a detailed schematic of a voltage pulse detection circuit utilized in the power supply of FIG. 2.

Referring to FIG. 3, the voltage pulse detection circuit 46 is provided to detect when either of switches 34, 36 are stuck in an open or closed operational position, that is indicative of a first fault condition of the power supply 12. When such a condition occurs, one or more voltage pulses that should be detected at the node 64 are not detected. The voltage pulse detection circuit 46 includes a comparator 80, a resistor 84, a capacitor 86, and a diode 88. A non-inverting terminal (+) of the comparator 80 is electrically coupled to a node 82 and an inverting terminal (−) of the comparator 80 receives a reference voltage (VREF1). The resistor 84 is electrically coupled between the node 68 and the node 82. Further, a diode 88 is electrically coupled between the node 82 and the node 64. Finally, a capacitor 86 is electrically coupled between the node 82 and the node 70.

When a voltage pulse at the node 64 has a high logic value, electrical current flows through the resistor 84 to the capacitor 86 to charge the capacitor 86. As the capacitor 86 charges, a voltage increases at the node 82. When the voltage at node 82 becomes greater than the voltage (VREF1), the comparator 80 generates a fault signal (F1) having a high logic level that is transmitted to the logic gate 50. The time constant of the resistor 84 and the capacitor 86 is greater than one or more periods of the voltage pulses being applied to node 82 at a predetermined frequency. This time constant ensures that noise and other perturbations will not cause false triggering of a fault condition. In the exemplary embodiment, the time constant of the resistor 84 and the capacitor 86 is equal to the time duration of a time period from a time (T3) to a time (T7) representing three time periods of the voltage pulses. Thus, in the exemplary embodiment, when the three voltage pulses are not detected at the node 64, the comparator 80 generates the fault signal (F1) having the high logic level. Alternately, when the voltage at node 82 is less than the voltage (VREF1), the comparator maintains the fault signal (F1) at a low logic level indicating that the first fault condition has not been detected.

Figure 4:
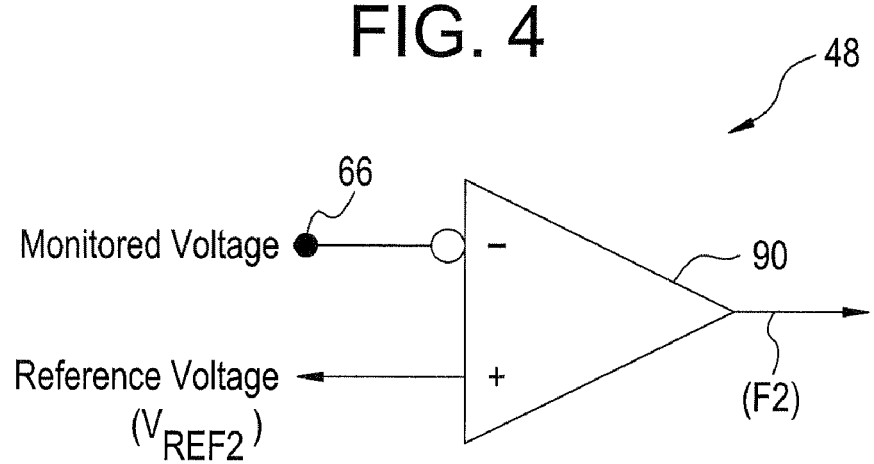
FIG. 4 is a voltage level detection circuit utilized in the power supply of FIG. 2.
Figure 5:
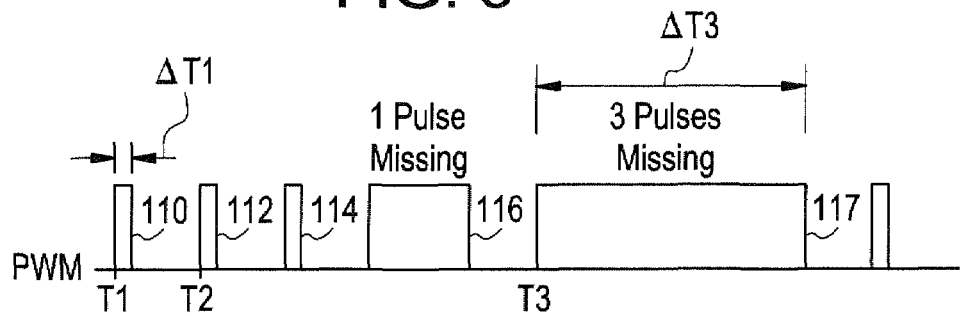
FIG. 5 is a schematic of a signal generated by a pulse width modulation controller at a node 64 of FIG. 2.
Figure 6:
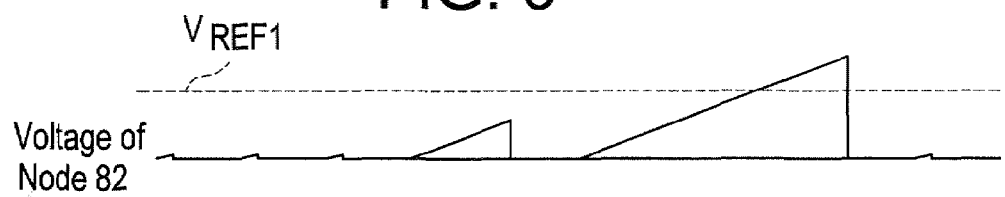
FIG. 6 is a schematic of a signal generated at a node 82 of the voltage pulse detection circuit of FIG. 3.
Figure 7:
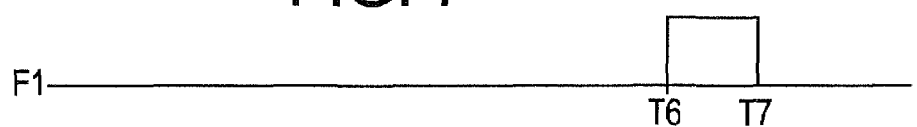
FIG. 7 is a schematic of a first operational fault signal generated by the voltage pulse detection circuit of FIG. 2.
Figure 8:
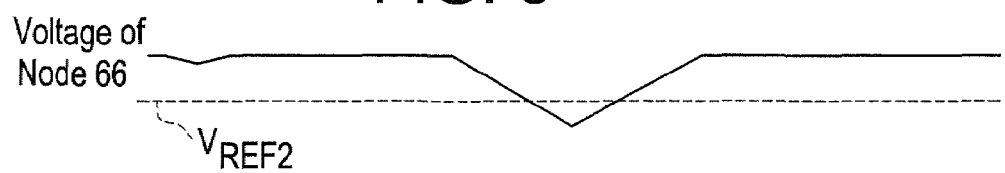
FIG. 8 is a schematic of a signal generated at a node 66 of the power supply of FIG. 2.
Figure 9:
FIG. 9 is a schematic of a second fault signal generated by a voltage level detection circuit of FIG. 2.
Figure 10:
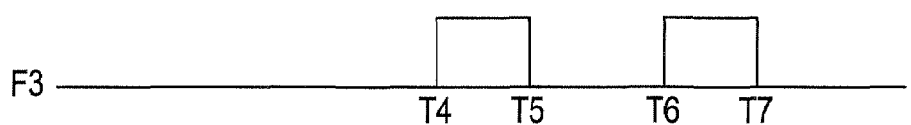
FIG. 10 is a schematic of a signal generated by a logic gate of the low-voltage detection circuit of FIG. 2.

Referring to FIG. 4, the voltage level detection circuit 48 is provided to detect when an output voltage at the node 66 is below a predetermined threshold voltage that is indicative of a second fault condition of the power supply 12. The second fault condition can occur when the switch 36 is electrically shorted, which induces the voltage at the node 66 to fall below the threshold voltage (VREF2). The voltage level detection circuit 48 includes a comparator 90 having a non-inverting terminal (+) and an inverting terminal (−). The inverting terminal (−) is electrically coupled to the node 66. The non-inverting terminal (+) receives the reference voltage (VREF2). When a voltage applied to the node 66 falls below the reference voltage (VREF2), the comparator 90 outputs a second fault signal (F2) having a high logic level that is indicative of a second fault condition of the power supply 12.

The logical OR gate 50 is operably coupled to the voltage pulse detection circuit 46 and to the voltage level detection circuit 48 and receives the first and second fault signals (F1), (F2) from the circuits 46, 48, respectively. When either of the signals (F1), (F2) have a high logic level, the gate 50 generates a fault signal (F3) having a high logic level which is transmitted to the switch 42. In response, the switch 42 moves to an open operational position to stop the flow of current from the power supply 12 through the electrical line 20. When both of the signals (F1), (F2) have a low logic level, the gate 50 generates a fault signal (F3) having a low logic level that is transmitted to the switch 42. In response, the switch 42 moves to a closed operational position to allow current to flow through the electrical line 20 from the power supply 12.

Referring to FIGS. 3, 5–7, the detection of fault conditions within the power supply 12 will now be explained. The PWM controller 64 induces the switches 34, 36 to generate the voltage pulses 110, 112, 114, and 116. As shown, each of the pulses 110, 112, 114 comprise a high logic level with a time duration of (ΔT1) indicative of normal operation of the power supply 12. The voltage pulse 116 has a high logic level with the time duration equal to that of two voltage pulse periods. In other words, one additional voltage pulse that should be present was not detected. However, since the voltage at the node 82 of the comparator 90 never exceeds the reference voltage (VREF1), the voltage pulse detection circuit 70 does not generate a fault signal having high logic value. Thereafter, the switches 34, 36 generate the voltage pulse 117 having a high logic level having a time duration equal to that of three voltage pulse periods. Because the voltage at the node 82 exceeds the reference voltage (VREF1) between time (T6) and time (T7), the comparator 90 generates a first fault signal (F1) having a high logic value during this time interval. In response to the signal (F1), the logic gate 50 generates a fault signal (F3) having a high logic value that induces the switch 42 to move to an open operational position. Thus, when at least three missing pulses are detected at the node 64, the switch 42 is moved to an open operational position to prevent current flow from the power supply 12 to the electrical line 20.

Referring to FIGS. 4, and 8–10, between times (T4) and (T5), the voltage at node 66 is less than the reference voltage (VREF2). In response, the comparator 90 of the voltage level detection circuit 48 generates a second fault signal (F2)

having a high logic value during the time interval from (T4) to (T5). In response to the signal (F2), the logic gate 50 generates the third fault signal (F3) having a high logic level that induces the switch 42 to move to an open operational position. When a voltage greater than a reference voltage (VREF2) is detected at the node 66, the switch 42 is moved to an open operational position to prevent current flow from the power supply 12 to the electrical line 20.

The system and method for detecting operational fault conditions in a power supply provides a substantial advantage over other systems and methods. In particular, the system and method provide a technical effect of detecting operational fault conditions in a power supply utilizing internal signals generated by the power supply, instead of merely monitoring an output voltage of the power supply. Thus, the inventive system allows fault conditions to be detected more quickly than other systems, to prevent a disruption of electrical power to the load 18.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Moreover, the use of the term's first, second, etc. does not denote any order of importance, but rather the term's first, second, etc. are used to distinguish one element from another.

I claim:

1. A method for detecting an operational fault condition in a power supply, the power supply having a controller operably coupled to first and second switches, the first and second switches being connected in series between a voltage source and a ground node, wherein a first electrical node is electrically coupled between the first and second switches, the first electrical node being further electrically coupled to a first end of an inductor, the controller configured to induce the first and second switches to apply voltage pulses to the first electrical node, the method comprising:

monitoring a voltage at the first electrical node to determine a number of voltage pulses being applied to the first electrical node over a predetermined time interval; and determining when a first operational fault condition has occurred when the number of voltage pulses being applied to the first electrical node over the predetermined time interval is less than or equal to a predetermined number of voltage pulses.

2. The method of claim 1, further comprising:

measuring a voltage level at a second end of the inductor; and determining when a second operational fault condition has occurred when the measured voltage level is less than a predetermined voltage level.

3. The method of claim 1, wherein the predetermined number of voltage pulses comprises one or more voltage pulses.

4. The method of claim 1, wherein the first operational fault condition occurs when at least one of the first and second switches are non-operational.

5. The method of claim 1, further comprising electrically disconnecting the second end of the inductor from a load when the first operational fault condition has occurred.

6. A system for detecting an operational fault condition in a power supply, the power supply having a controller operably coupled to first and second switches, the first and second switches being connected in series between a voltage source and a ground node, wherein a first electrical node is electrically coupled between the first and second switches, the first electrical node being further electrically coupled to a first end of an inductor, the controller configured to induce the first and second switches to apply voltage pulses to the first electrical node, the system comprising:

a voltage pulse detection circuit operably coupled to the first electrical node that determines the number of voltage pulses being applied to the first electrical node over a predetermined time interval, the voltage pulse detection circuit generating a first signal indicating that a first operational fault condition has occurred when the number of voltage pulses being applied to the first electrical node over the predetermined time interval is less than or equal to a predetermined number of voltage pulses.

7. The system of claim 6, further comprising a voltage level detection circuit operably that measures a voltage level at the second end of the inductor and generating a second signal indicating a second operational fault condition has occurred when the measured voltage level is less than or equal to a predetermined voltage level.

8. The system of claim 7, further comprising a logic gate operably coupled to the voltage pulse detection circuit and the voltage level detection circuit, the logic gate receiving the first and second signals and generating a third signal to induce a third switch to disconnect the power supply from the load.

9. The system of claim 6, wherein the predetermined number of voltage pulses comprises one or more voltage pulses.

10. The system of claim 6, wherein the first operational fault condition occurs when at least one of the first and second switches are non-operational.

11. A system for detecting an operational fault condition in a power supply, the power supply having a controller operably coupled to first and second switches, the first and second switches being connected in series between a voltage source and a ground node, wherein a first electrical node is electrically coupled between the first and second switches, the first electrical node being further electrically coupled to a first end of an inductor, the controller configured to induce the first and second switches to apply voltage pulses to the first electrical node, the system comprising:

means for monitoring a voltage at the first electrical node to determine a number of voltage pulses being applied to the first electrical node over a predetermined time interval; and means for determining when a first operational fault condition has occurred when the number of voltage pulses being applied to the first electrical node over the predetermined time interval is less than or equal to a predetermined number of voltage pulses.

* * * * *

UNITED STATES PATENT AND TRADEMARK OFFICE
CERTIFICATE OF CORRECTION

| | | |
|---|---|---|
| PATENT NO. | : 7,091,739 B2 | Page 1 of 1 |
| APPLICATION NO. | : 10/710204 | |
| DATED | : August 15, 2006 | |
| INVENTOR(S) | : Timothy James Williams | |

It is certified that error appears in the above-identified patent and that said Letters Patent is hereby corrected as shown below:

<u>Column 2</u>:
Line 15, after "node.", insert -- The system includes a voltage pulse detection circuit operably coupled to the first electrical node that determines the number of voltage pulses being applied to the first electrical node over a predetermined time interval, the voltage pulse detection circuit generating a first signal indicating that a first operational fault condition has occurred when the number of voltage pulses being applied to the first electrical node over the predetermined time interval is less than or equal to a predetermined number of voltage pulses.

A system for detecting an operational fault condition in a power supply in accordance with another exemplary embodiment is provided. The power supply has a controller operably coupled to first and second switches. The first and second switches are connected in series between a voltage source and a ground node, wherein a first electrical node is electrically coupled between the first and second switches. The first electrical node is further electrically coupled to a first end of an inductor. The controller is configured to induce the first and second switches to apply voltage pulses to the first electrical node.--

Signed and Sealed this

Twenty-third Day of January, 2007

JON W. DUDAS
*Director of the United States Patent and Trademark Office*